US00RE35734E

United States Patent [19]

Rondeau

[11] E Patent Number: Re. 35,734

[45] Reissued Date of Patent: Feb. 17, 1998

[54] METAL CORE FIBEROPTIC CONNECTOR PLUG FOR SINGLE FIBER AND MULTIPLE FIBER COUPLING

[75] Inventor: Michel Y. Rondeau, San Jose, Calif.

[73] Assignee: Fibotech, Inc., San Jose, Calif.

[21] Appl. No.: 296,609

[22] Filed: Aug. 29, 1994

Related U.S. Patent Documents

Reissue of:

[64] Patent No.: 5,216,735
Issued: Jun. 1, 1993
Appl. No.: 429,445
Filed: Oct. 31, 1989

[51] Int. Cl.[6] ..... G02B 6/36

[52] U.S. Cl. ..... 385/78

[58] Field of Search ..... 385/76, 77, 78, 385/80, 81, 84, 139, 60, 61

[56] References Cited

U.S. PATENT DOCUMENTS

| | | | |
|---|---|---|---|
| 4,023,886 | 5/1977 | Nakayama et al. | 385/400 X |
| 4,076,379 | 2/1978 | Chouinard | 385/78 X |
| 4,116,655 | 9/1978 | Lewis | 385/100 X |
| 4,127,319 | 11/1978 | Forney, Jr. et al. | 385/139 X |
| 4,133,601 | 1/1979 | Le Guen et al. | 385/81 X |
| 4,140,366 | 2/1979 | Makuch et al. | 385/54 X |
| 4,140,367 | 2/1979 | Makuch et al. | 385/55 X |
| 4,162,119 | 7/1979 | Goodman | 385/53 X |
| 4,173,389 | 11/1979 | Curtis | 385/53 X |
| 4,178,068 | 12/1979 | Hoover | 385/76 X |
| 4,193,665 | 3/1980 | Arnold | 385/52 X |
| 4,205,897 | 6/1980 | Stankos | 385/53 X |
| 4,208,093 | 6/1980 | Borsuk | 385/76 X |
| 4,218,113 | 8/1980 | Uberbacher | 385/139 X |
| 4,260,382 | 4/1981 | Thomson | 433/126 |
| 4,261,642 | 4/1981 | Lewis et al. | 385/81 X |
| 4,300,815 | 11/1981 | Malsot et al. | 385/64 X |
| 4,310,218 | 1/1982 | Karol | 385/64 X |
| 4,370,022 | 1/1983 | Johnson | 385/95 X |
| 4,440,469 | 4/1984 | Schumacher | 385/81 X |
| 4,458,983 | 7/1984 | Roberts | 385/62 X |
| 4,470,660 | 9/1984 | Hillegonds et al. | 385/76 X |
| 4,678,264 | 7/1987 | Bowen et al. | 385/88 X |
| 4,687,292 | 8/1987 | Krausse | 385/78 |
| 4,693,550 | 9/1987 | Brown et al. | 385/78 X |
| 4,740,047 | 4/1988 | Abe et al. | 385/123 X |
| 4,750,803 | 6/1988 | Schmidt | 385/53 X |
| 4,752,111 | 6/1988 | Fisher | 385/53 X |
| 4,767,181 | 8/1988 | McEowen | 385/78 |
| 4,785,139 | 11/1988 | Lynch et al. | 174/705 |
| 4,787,706 | 11/1988 | Cannon, Jr. et al. | 385/60 X |
| 4,869,571 | 9/1989 | Hübner et al. | 385/78 X |
| 4,946,236 | 8/1990 | Dautartus et al. | 385/16 X |
| 4,961,624 | 10/1990 | Savitsky et al. | 385/81 X |
| 4,968,109 | 11/1990 | Tanaka | 385/78 X |
| 4,979,793 | 12/1990 | Bowen et al. | 385/140 X |
| 5,042,900 | 8/1991 | Parker | 385/76 |
| 5,080,460 | 1/1992 | Erdman et al. | 385/81 |
| 5,107,536 | 4/1992 | Wall | 385/81 |
| 5,113,464 | 5/1992 | Wall | 385/85 |
| 5,140,662 | 8/1992 | Kumar | 385/87 |
| 5,216,735 | 6/1993 | Rondeau | 385/78 |
| 5,275,596 | 1/1994 | Long et al. | 606/28 X |
| 5,276,752 | 1/1994 | Gugelmeyer et al. | 385/69 |
| 5,282,258 | 1/1994 | Hoshino | 385/70 |
| 5,305,406 | 4/1994 | Rondeau | 385/81 |

FOREIGN PATENT DOCUMENTS

| | | | |
|---|---|---|---|
| 0-014-610 | 8/1980 | European Pat. Off. | 385/88 X |
| 3308-679-A1 | 9/1984 | Germany | 385/53 X |
| 53-6047 | 1/1978 | Japan | 385/78 X |
| 57-34514 | 2/1982 | Japan | 385/53 X |
| 63-250614 | 10/1988 | Japan | 385/60 X |

*Primary Examiner*—Brian Healy
*Attorney, Agent, or Firm*—Conley, Rose & Tayon, P.C.

[57] ABSTRACT

The present invention relates to devices for the transmission of light through the adjoining ends of two fiberoptic cables, and more particularly to connectors adapted to connect an end of a fiberoptic cable to another fiberoptic cable or to a LED or to a laser.

51 Claims, 2 Drawing Sheets

METAL CORE FIBEROPTIC CONNECTOR PLUG FOR SINGLE FIBER AND MULTIPLE FIBER COUPLING

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to devices for the transmission of light through the adjoining ends of two fiberoptic cables, and more particularly to connectors adapted to connect an end of a fiberoptic cable to another fiberoptic cable or to a LED or to a laser.

2. Description of the Prior Art

Fiberoptic connectors utilized to join the ends of the fibers to two fiberoptic cables are well known. A complete connector consists of two conical plugs and an alignment sleeve. The sleeve allows the two optical fibers within the two plugs to be aligned with a tolerance of a few microns, such that correct fiberoptic transmission can occur.

The prior art connector plugs are typically molded utilizing a glass-epoxy resin into the desired conical shape. For added strength, some prior art plugs include a metal sleeve that is centrally disposed within the plug along a portion of its length; however, the conical tip of the plug is completely composed of the glass-epoxy resin.

Other prior art connector plugs have been formed entirely out of metal. Such metal connector plugs are susceptible to scratching and deformation if mishandled or dropped, thus leading to misalignment. Additionally, metal plugs cannot be effectively utilized as electrical connectors due to the lack of insulation.

SUMMARY OF THE INVENTION

It is an object of the present invention to provide a fiberoptic connector plug having a metal core and a glass-epoxy resin body formed thereabout.

It is another object of the present invention to provide a metal core fiberoptic connector plug having a metal tip for improved heat dissipation.

It is a further object of the present invention to provide a metal core fiberoptic connector plug having a plastic body for ease of handling and reliability.

It is yet another object of the present invention to provide a metal core fiberoptic connector plug having a metal tip that may be crimped to provide a mechanical holding of the optical fiber within the tip.

It is yet a further object of the present invention to provide a fiberoptic connector having an electrically conductive metal core which facilitates electrical connection as well as optical connection through the connector plateau.

It is still another object of the present invention to provide a metal core fiberoptic connector for high-power applications having an air gap between the optical fiber and the metal tip to facilitate heat dissipation.

The metal core fiberoptic connector of the present invention includes a connector plug having a cone shaped connection interface, such that it is compatible with existing connection plugs and alignment sleeves. The present invention includes a metal core that extends throughout the length of the connector. The metal core terminates in the connection tip of the plug in an exposed plateau, and a bore is formed in the plateau through which the optical fiber passes. A glass-epoxy resin body surrounds the metal core. In the preferred embodiment, the metal core includes radially projecting portions which facilitate a firm engagement with the outer body which surrounds the metal core.

In an alternative embodiment of the present invention for high-power applications, a relatively large bore is formed in the metal tip. The optical fiber is held within a glass sleeve that is centrally disposed in the bore, and an air gap surrounds the glass sleeve within the bore. This embodiment provides enhanced heat dissipation and thereby facilitates the connection of high-power optical fibers.

It is an advantage of the present invention that it provides a fiberoptic connector plug having a metal core and a glass-epoxy resin body formed thereabout.

It is another advantage of the present invention that it provides a metal core fiberoptic connector plug having a metal tip for improved heat dissipation.

It is a further advantage of the present invention that it provides a metal core fiberoptic connector plug having a plastic body for ease of handling and reliability.

It is yet another advantage of the present invention that it provides a metal core fiberoptic connector plug having a metal tip that may be crimped to provide a mechanical holding of the optical fiber within the tip.

It is yet a further advantage of the present invention that it provides a fiberoptic connector having an electrically conductive metal core which facilitates electrical connection as well as optical connection through the connector plateau.

It is still another advantage of the present invention that it provides a metal core fiberoptic connector for high-power applications having an air gap between the optical fiber and the metal tip to facilitate heat dissipation.

The foregoing and other objects, features and advantages of the present invention will be apparent from the following description of the preferred embodiments which make reference to the several figures of the drawings.

IN THE DRAWINGS

DESCRIPTION OF THE PREFERRED EMBODIMENTS

Figure 1:
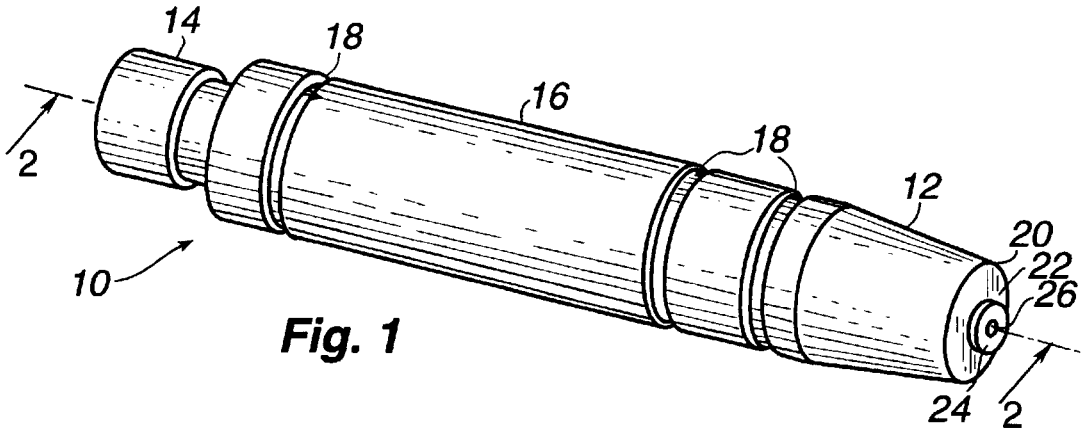
FIG. 1 is a perspective view of the metal core fiberoptic connector plug of the present invention.

A perspective view of the metal core fiberoptic connector plug 10 of the present invention is depicted in FIG. 1. The connector plug 10 is outwardly shaped to be compatible with standard fiberoptic connection devices which include two connector plugs (that are outwardly shaped substantially identical to the connector plug 10) and an alignment sleeve which is utilized to align the two connector plugs.

The connector plug 10 is formed with a frontal cone portion 12 and a rearward cable insertion portion 14. The connector 10 has a body portion 16 into which annular grooves 18 are formed to facilitate the handling of the connector 10. Three such grooves 18 are provided in the preferred embodiment. The cone portion 12 is truncated to form a frustrum shaped nose 20 which is designed to properly fit into preexisting, conventional fiberoptic alignment sleeves which serve to join two fiberoptic connector plugs in a nose to nose configuration. The nose 20 includes a flat connection face 22 having a slightly raised plateau 24 centrally disposed therein, and an optical fiber bore 26 is centrally formed through the plateau 24. As will appear from the following description, the plateau 24 is formed from a thermally and electrically conductive material such as a metal, whereas the body 16, including the nose 20, is formed from a non-conducting material such as a glass-epoxy resin.

Figure 2:
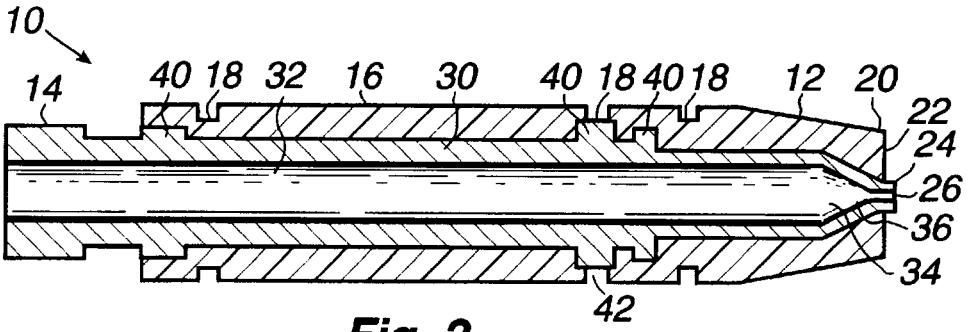
FIG. 2 is a cross-sectional view of the present invention taken along lines 2—2 of FIG. 1.

FIG. 2 depicts a cross-sectional view of the fiberoptic connector 10 shown in FIG. 1. As depicted therein, the plateau 24 is the frontal tip of a generally cylindrical core 30 which traverses the length of the connector plug 10. The core 30 has a smooth, cylindrical inner bore 32 formed therein for holding a fiberoptic cable as is discussed hereinbelow. The inner bore 32 terminates at its forward end in a cone shaped cavity portion 34 having an apex 36 which peaks at the inner terminus of the optical fiber bore 26 through the plateau 24. The [inner bore] *core 30* is substantially surrounded by the generally cylindrical body 16 that is composed of a thermally and electrically non-conductive substance such as a glass-epoxy resin.

In the preferred embodiment, the outer surface of the core 30 is formed with a plurality of radially extending annular ridges 40 which project into and are generally surrounded by the body 16 of the connector 10. The ridges 40 serve to hold the core 30 and the body 16 fixedly together.

As an alternative feature, as depicted in FIG. 2, an annular groove 42, which is one of the three annular grooves 18 described hereinabove, may penetrate through the body 16 to expose the core 30 at one of the ridges 40. The exposure of the electrically conductive core material through groove 42 provides an access point for an outside connector, not shown, to make an electrical contact with the core 30.

Figure 3:
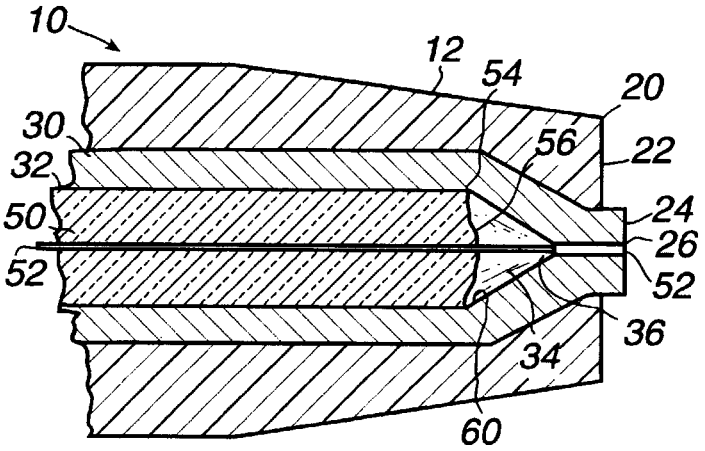
FIG. 3 is an enlarged view of the connector tip of the device depicted in FIG. 2, showing a fiberoptic cable disposed therewithin.
Figure 4:
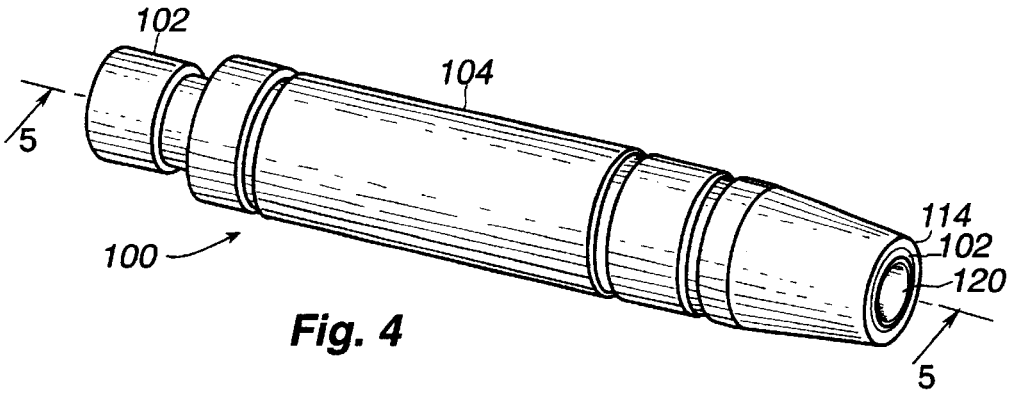
FIG. 4 is a perspective view of an alternative embodiment of the metal core fiberoptic connector plug of the present invention.

FIG. 3 depicts an enlarged view of the connection tip of the device depicted in FIG. 2, having a fiberoptic cable disposed therein. For ease of comprehension, the elements of the invention depicted in FIG. 3 are numbered identically to those elements as previously discussed. A fiberoptic cable 50 is disposed within the inner bore 32 of the core 30. The fiberoptic cable 50 includes an optical fiber 52 that is centrally disposed within the cable 50. The cable 50 is shown fully inserted within the inner bore 32, such that the outer portions 54 of the end 56 of the cable 50 make contact with the inner surface 60 of the cone-shaped portion 34 of the inner bore 32. The optical fiber 52 extends beyond the end 56 of the fiberoptic cable 50 and penetrates through the apex 36 of the cone-shaped cavity 34, into and through the optical fiber bore 26. The optical fiber 52 terminates at the face of the plateau 24.

The protrusion of the metal plateau 24 beyond the face 22 of the plug permits the mechanical crimping of the metal plateau about its edges to collapse the optical fiber bore 26 about the optical fiber 52 disposed therein. Such crimping achieves a mechanical holding of the optical fiber within the plug, thus eliminating the use of an epoxy or other typical adhesive. Such a mechanical holding permits the plug 10 to be utilized for higher power applications where the use of an epoxy adhesive is not effective.

While the embodiment depicted in FIGS. 1, 2 and 3 is shown for a single fiber cable it is equally suitable for multiple fiber cables. In such an installation, the multiple fibers all protrude through the bore 26, which must be enlarged in its diameter, and the metal tip may be crimped to achieve a mechanical holding of the optical fibers within the tip. Of course, for lower power applications, an epoxy sealant may be utilized to hold the multiple fibers within the tip.

It is therefore to be understood that when the connector 10 is joined with a similar connector or with a properly configured LED or laser, that an optical connection will be achieved through the alignment of the optical fibers of the devices, and also that an electrical connection can be achieved through the surface of the electrically conductive plateau 24 with an electrically similarly configured electrically conductive member formed in the device to which the present invention is connected. The metal tip provides enhanced heat dissipation over that of conventional glass-epoxy resin plugs. In high-power applications, the thermal buildup can melt the tips and thereby destroy conventional glass-epoxy resin plugs. Thus, the present invention permits the connection of higher power fiberoptic cables. The glass-epoxy resin body of the present invention is an improvement over pre-existing metallic plugs. Such metallic plugs are susceptible to deformation upon dropping and mishandling, whereas the glass-epoxy resin body of the present invention acts as a shock-absorbing protectant from mishandling and from scratching as well.

To manufacture the present invention, a metal core 30 is placed in a mold of an injection molding machine. The core does not have an optical fiber bore formed therein. The connector body 16 is then molded around the core 30 within the injection molding machine. The use of an injection molding machine increases the accuracy of the manufacturing process, such that the angle and the roughness of the cone portion 12 of the connector are accurately formed. Thereafter, the connector is placed in a high precision drill which accurately drills the optical fiber bore 26 through the plateau 24, in such a manner that the bore 26 is centrally disposed relative to the cone surfaces 12.

Figure 5:
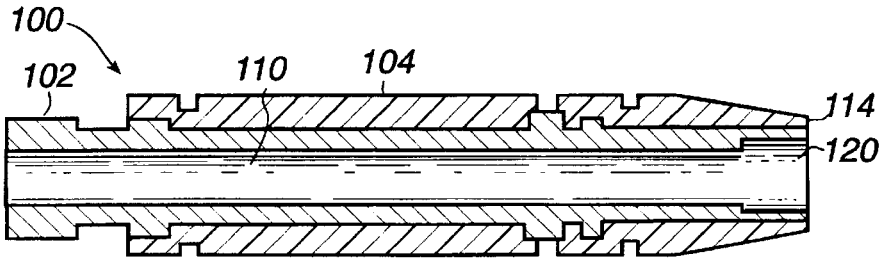
FIG. 5 is a cross-sectional view of the present invention taken along lines 5—5 of FIG. 4.
Figure 6:
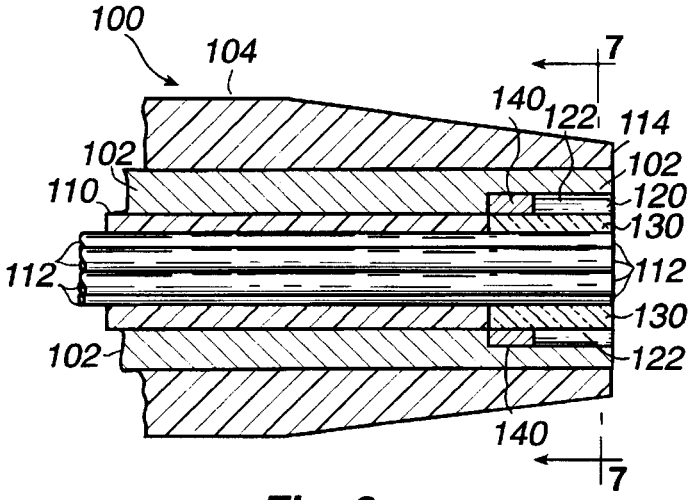
FIG. 6 is an enlarged view of the connection tip of the device depicted in FIG. 5, showing a fiberoptic cable disposed therewithin.
Figure 7:
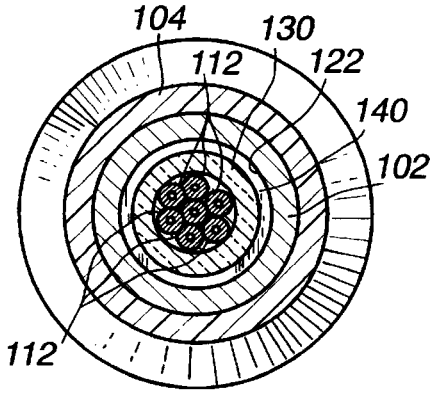
FIG. 7 is a cross-sectional view taken along lines 7—7 of FIG. 6.

FIGS. 4, 5, 6 and 7 depict an alternative embodiment 100 of the present invention. This embodiment 100 is suitable for high-power multiple fiber connection. The plug 100 includes a metal core 102 which extends throughout the length of the plug 100. The metal core 102 is surrounded by a connector body 104 which is preferably formed from a glass-epoxy resin. As is best depicted in FIGS. 5, 6 and 7, the metal core 102 extends throughout the length of the connector 100. The metal core 102 is substantially formed as a hollow cylinder having a cable bore 110 formed axially therethrough for holding a fiberoptic cable bundle 112 therein. A bore of larger diameter than the optical cable bundle 112 is axially disposed in the metal core from the connection end 114. The connection bore 120 is of sufficient diameter that a relatively substantial air gap 122 will exist between the outer surface of the optical fibers of the bundle 112 disposed therein and the inner surface of the bore 120.

To facilitate the alignment and holding of the optical fibers within the bore 120, the optical fibers 112 are held within a thin-walled high temperature glass tube 130. The length of tube 130 corresponds to the depth of the bore 120.

A metal sleeve 140 is disposed around the glass tube 130 proximate the inner end of the glass tube. The metal sleeve acts as a frictional engagement to hold the glass tube and optical fibers 112 disposed therewithin a fixed, centrally disposed location in the tip of the connector plug 100. After the optical fibers 112 with glass tube and metal sleeve is installed within the tip of the connector 100, the tip is polished, such that the optical fibers 112, glass tube 130 and the metal core 102 all terminate in a flush manner. It is therefore to be realized that an air gap 122 will exist between the outer surface of the glass tube 130 and the inner surface of the bore 120 within the metal core 102. In high-power optical cable connections it is known that even the metal tips of the connector plugs can be melted by the optical beam power. The present invention utilizes a high temperature glass tube 130 to surround the optical fibers 112 at the connection point, whereby higher power can be transmitted because the high temperature glass can withstand higher temperatures than the metal sleeve. The air gap serves to dissipate the thermal energy absorbed by the glass tube and the heat that is then absorbed by the metal core 102 is thermally conducted away from the tip. The connector plug 100 thus serves to provide a means of connecting high power optical fibers.

In the preferred embodiment of the connector plug 100, the bore 120 is formed with a depth of approximately 0.3 inches and a diameter of approximately 0.1 inches. The glass tube 130 is formed with a diameter of approximately 0.07 inches such that the air gap 122 which surrounds the glass tube 130 is approximately 0.015 inches. The metal sleeve 140 has a length of approximately 0.15 inches to aid in holding and centering the fiber bundle 112 and glass tube 130 within the bore 120.

While the invention has been particularly shown and described with reference to certain preferred embodiments, it will be understood by those skilled in the art that various alterations and modifications in form and detail may be made therein. Accordingly, it is intended that the following claims cover all such alterations and modifications as may fall within the true spirit and scope of the invention.

What I claim is:

1. A fiberoptic connector plug that is attachable to the end of a fiberoptic cable for the optical connection of at least one optical fiber within the fiberoptic cable to another light source such as another optical fiber, a light emitting diode and a laser, comprising:

a connector body being substantially cylindrical in shape;

a thermally conductive core member being substantially cylindrical in shape and being fixedly engaged within said connector body;

said core body having a cylindrical bore axially formed therewithin, said bore having an open rearward end and a forward end that terminates in a cone shaped cavity;

a forwardly disposed portion of said core member being exposed through said connector body to form an exposed connection plateau;

an optical fiber bore being formed through said connection plateau and terminating in said apex of said cone shaped cavity.

2. A fiberoptic connector plug as described in claim 1 wherein said core member is electrically conductive.

3. A fiberoptic connector plug as described in claim 1 wherein said core member is formed with an engagement means for fixedly engaging said core member with said connector body.

4. A fiberoptic connector plug as described in claim 3 wherein said engagement means includes at least one ridge element projecting from said core member into said connector body.

5. A fiberoptic connector plug as described in claim 4 wherein said core member is composed of an electrically conductive metal.

6. A fiberoptic connector plug as described in claim 5 wherein at least one groove is formed in said connector body, the depth of said groove being sufficient to expose the surface of said core member.

7. A fiberoptic connector plug that is attachable to the end of a fiberoptic cable for the optical connection of at least one optical fiber within the fiberoptic cable to another light source such as another optical fiber, a light emitting diode and a laser, comprising:

a connector body being substantially cylindrical in shape;

a thermally conductive core member being substantially cylindrical in shape and being fixedly engaged within said connector body;

said core body having a cylindrical bore axially formed therewithin, for holding at least one optical fiber within said bore, an enlarged portion of said bore being formed with a diameter that is substantially larger than the diameter of said at least one optical fiber, such that a substantial air gap surrounds said at least one optical fiber disposed within said enlarged portion of said bore.

8. A fiberoptic connector plug as described in claim 7 wherein said at least one optical fiber that is disposed within said bore is held within a tubular member, and a substantial air gap surrounds said tubular member within said enlarged portion of said bore.

9. A fiberoptic connector plug as described in claim 8 wherein a connection means is disposed within said bore to hold said at least one optical fiber in a centrally disposed position within said enlarged portion of said bore.

10. A fiberoptic connector plug as described in claim 9 wherein said connection means includes a sleeve member being circumferentially engaged to the outer surface of said tubular member and disposed within said enlarged portion of said bore, whereby said tubular member and said at least one optical fiber are held in a centrally positioned orientation within said enlarged portion of said bore.

11. A fiberoptic connector plug as described in claim 10 wherein said cylindrical core member is formed with a first end and a second end, said first end being positioned to receive said at least one optical fiber into said bore formed therein, and said second end being disposed proximate an output end of said at least one optical fiber; and wherein said enlarged portion of said bore is positioned proximate said second end of said core member.

12. A fiberoptic connector plug as described in claim 7 wherein a connection means is disposed within said enlarged portion of said bore to hold said at least one optical fiber in a centrally disposed position within said enlarged portion of said bore.

13. A fiberoptic connector plug as described in claim 12 wherein said cylindrical core member is formed with a first end and a second end, said first end being positioned to receive said at least one optical fiber into said bore formed therein, and said second end being disposed proximate an output end of said at least one optical fiber; and wherein said enlarged portion of said bore is positioned proximate said second end of said core member.

14. A fiberoptic connector plug as described in claim 7 wherein said cylindrical core member is formed with a first end and a second end, said first end being positioned to receive said at least one optical fiber into said bore formed therein, and said second end being disposed proximate an output end of said at least one optical fiber; and wherein said enlarged portion of said bore is positioned proximate said second end of said core member.

*15. A fiberoptic connector that is adapted to be attached during use to the end of a fiberoptic cable, comprising:*

*a connector body being substantially cylindrical in shape;*

*a thermally conductive core member being substantially cylindrical in shape and being fixedly engaged within said connector body;*

*said core member having a cylindrical bore axially formed therewithin, said bore having an open rearward end and a forward end that terminates in a cone shaped cavity;*

*a forwardly disposed portion of said core member being exposed through the connector body to form an exposed connection plateau; and*

*an optical fiber bore being formed through said connection plateau and terminating in an apex of said cone shaped cavity.*

*16. The fiberoptic connector of claim 15, further comprising an optical fiber disposed within the optical fiber bore.*

*17. The fiberoptic connector of claim 16 wherein at least a portion of the optical fiber bore is collapsed about the optical fiber.*

*18. The fiberoptic connector of claim 16 wherein the optical fiber is substantially centrally disposed within the optical fiber bore.*

*19. The fiberoptic connector of claim 18, wherein the optical fiber is disposed within the bore of the core member, and further comprising an optical fiber cable substantially surrounding at least a portion of the optical fiber disposed in the bore of the core member.*

*20. The fiberoptic connector of claim 16 wherein at least a portion of the connection plateau has been mechanically crimped about the optical fiber.*

*21. The fiberoptic connector of claim 16 wherein the optical fiber is held within the connector without application of an adhesive.*

*22. The fiberoptic connector of claim 16 wherein the optical fiber is held in a substantially centrally disposed position within the bore of the connection surface without application of an adhesive.*

*23. The fiberoptic connector of claim 15 wherein at least a portion of the connection plateau is mechanically deformed radially inward in a concentric fashion.*

*24. The fiberoptic connector of claim 15 wherein the connector body comprises a non-conducting material and the core member comprises an electrically conductive metal.*

*25. The fiberoptic connector of claim 15, further comprising at least one ridge projecting from the core member and extending into the connector body.*

*26. A fiberoptic connector, comprising:*

*a conductor body;*

*a thermally conductive core member being fixedly engaged within the connector body, the core member having a bore formed therewithin, the bore having a rearward end and a forward end; and*

*a forwardly disposed portion of the core member being exposed through the connector body to form an inwardly deformable connection surface.*

*27. The fiberoptic connector of claim 26, further comprising an optical fiber bore being formed through the connection surface.*

*28. The fiberoptic connector of claim 26, further comprising an optical fiber disposed within the bore.*

*29. The fiberoptic connector of claim 26 wherein at least a portion of the connection surface is mechanically deformed radially inward in a concentric fashion.*

*30. The fiberoptic connector of claim 28, further comprising an optical fiber bore being formed through the connection surface, and wherein at least a portion of the connection surface is mechanically deformed radially inward in a concentric fashion about the optical fiber.*

*31. The fiberoptic connector of claim 28 wherein at least a portion of the connection surface is crimped about the optical fiber.*

*32. The fiberoptic connector of claim 28 wherein at least a portion of the bore is collapsed about the optical fiber.*

*33. The fiberoptic connector of claim 28 wherein the optical fiber is substantially centrally disposed within an optical fiber bore in the connection surface.*

*34. The fiberoptic connector of claim 28, further comprising an optical fiber cable substantially surrounding at least a portion of the optical fiber disposed in the bore of the core member.*

*35. The fiberoptic connector of claim 28 wherein the optical fiber is held within the connector body without application of an adhesive.*

*36. The fiberoptic connector of claim 28 wherein the optical fiber is held in a substantially centrally disposed position within a bore of the connection surface without application of an adhesive.*

*37. The fiberoptic connector of claim 26 wherein the connector is adapted to be attached during use to the end of a fiberoptic cable.*

*38. The fiberoptic connector of claim 26 wherein the connector body and the core member are substantially cylindrically shaped.*

*39. The fiberoptic connector of claim 26 wherein the connector body comprises a non-conducting material and the core member comprises an electrically conductive metal.*

*40. The fiberoptic connector of claim 26, further comprising at least one ridge projecting from the core member and extending into the connector body.*

*41. The fiberoptic connector of claim 26 wherein the forward end of the core member bore terminates in a substantially cone shaped cavity.*

*42. A fiberoptic connector adapted to be attached during use to the end of a fiberoptic cable, comprising:*

*a connector body;*

*a thermally conductive core member being fixedly engaged within the connector body;*

*the core member having a bore formed therewithin which is adapted to hold at least one optical fiber within the bore during use; and*

*an enlarged portion of the bore being formed with a cross sectional area that is larger than a cross sectional area of at least one optical fiber, such that an air gap substantially surrounds at least a portion of at least one optical fiber disposed within the enlarged portion of the bore.*

*43. The fiberoptic connector of claim 42 wherein at least one optical fiber that is disposed within the bore is held within an elongated member, and an air gap substantially surrounds the elongated member within the enlarged portion of the bore.*

*44. The fiberoptic connector of claim 43, further comprising a sleeve member substantially surrounding at least a portion of the elongated member.*

*45. The fiberoptic connector of claim 42 wherein at least a portion of the bore is collapsed about at least one optical fiber.*

*46. The fiberoptic connector of claim 42 wherein at least one optical fiber is substantially centrally disposed within the bore.*

*47. The fiberoptic connector of claim 42 wherein at least one optical fiber is held within the bore without application of an adhesive.*

*48. The fiberoptic connector of claim 42 wherein the connector body and the core member are substantially cylindrically shaped.*

*49. The fiberoptic connector of claim 42 wherein the connector body comprises a non-conducting material and the core member comprises an electrically conductive metal.*

*50. The fiberoptic connector of claim 42, further comprising at least one ridge projecting from the core member and extending into the connector body.*

*51. The fiberoptic connector of claim 42 wherein a portion of the core member is exposed through the connector body to form a connection surface.*

* * * * *

UNITED STATES PATENT AND TRADEMARK OFFICE

CERTIFICATE OF CORRECTION

PATENT NO. : Re. 35,734
DATED : February 17, 1998
INVENTOR(S) : Michel Y. Rondeau It is certified that error appears in the above-identified patent and that said Letters Patent is hereby corrected as shown below:

Claim 26, col. 7, line 52, please delete "conductor" and substitute therefor -- connector --.

Signed and Sealed this

Second Day of June, 1998

*Attest:*

Bruce Lehman

BRUCE LEHMAN

*Attesting Officer*

*Commissioner of Patents and Trademarks*